No. 785,954. PATENTED MAR. 28, 1905.
P. B. JOHNSON & J. E. McCOY.
PUMPING AND MIXING APPARATUS FOR CARBURETERS.
APPLICATION FILED JAN. 20, 1903.

Witnesses:
Inventors
Peter B. Johnson
James E. McCoy
By Paul Synnestvedt
Att'y

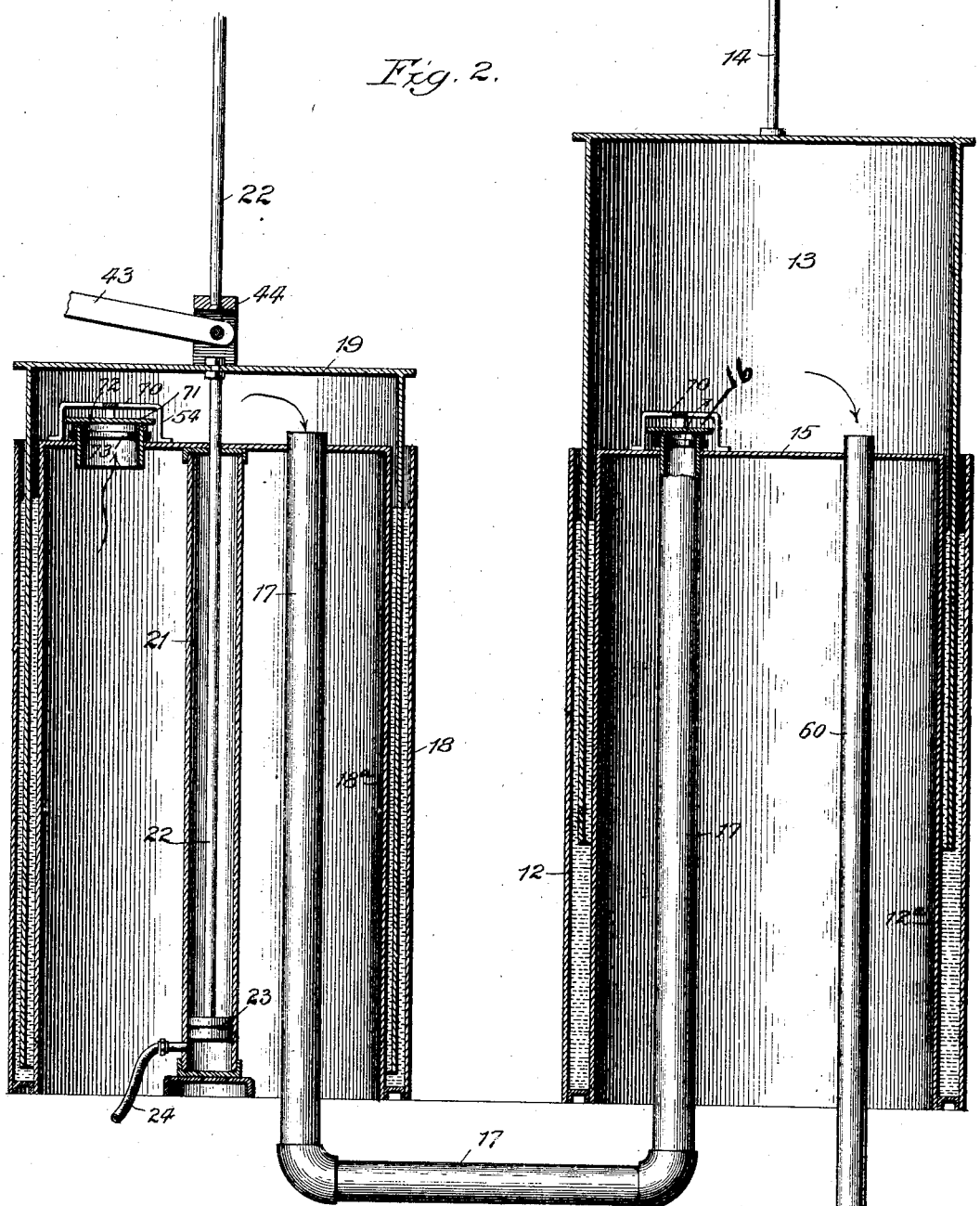

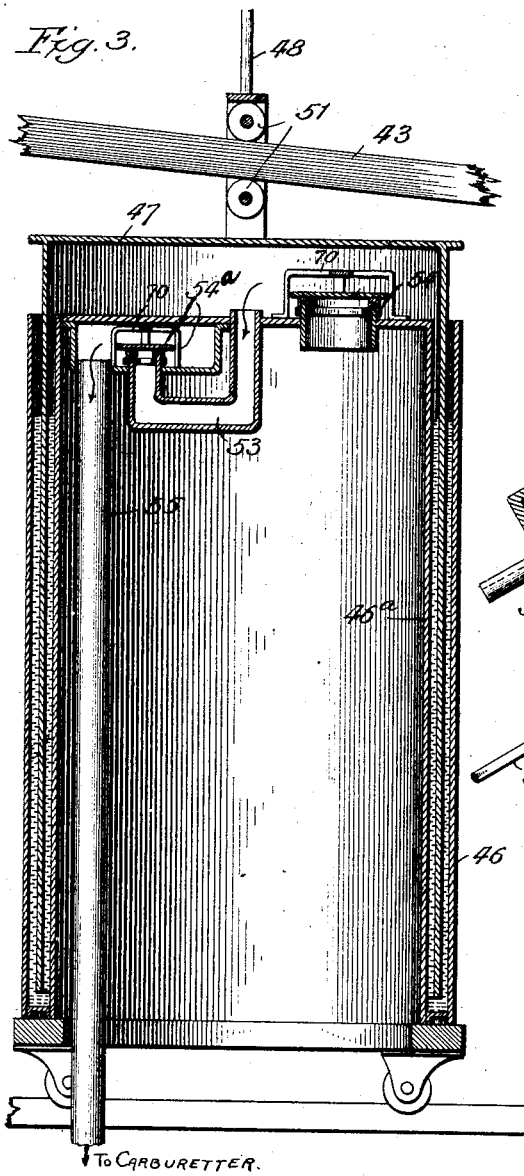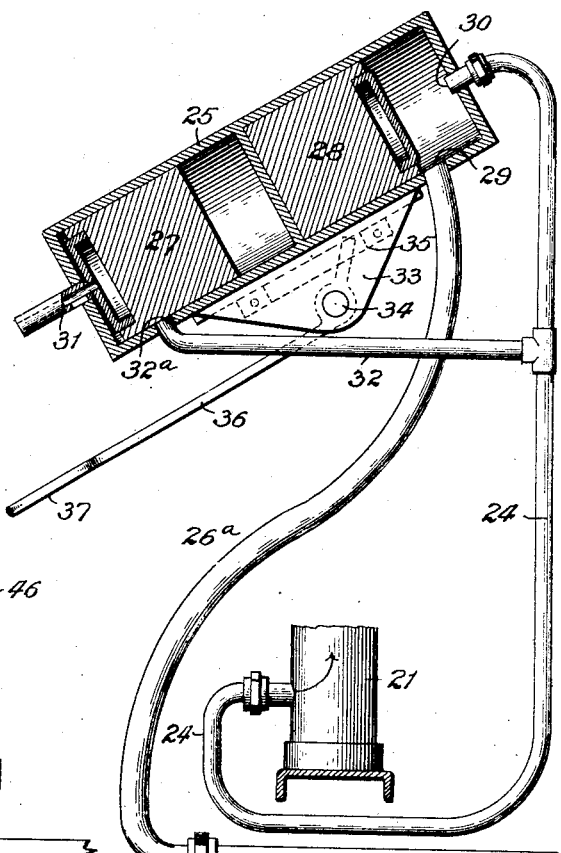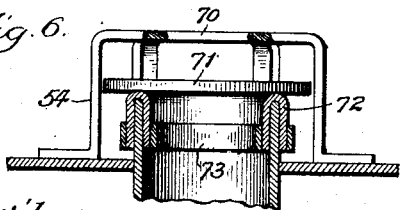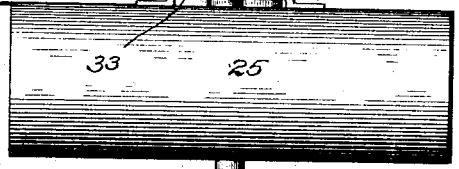

No. 785,954.	Patented March 28, 1905.

UNITED STATES PATENT OFFICE.

PETER B. JOHNSON AND JAMES E. McCOY, OF HEGEWICH, ILLINOIS.

PUMPING AND MIXING APPARATUS FOR CARBURETERS.

SPECIFICATION forming part of Letters Patent No. 785,954, dated March 28, 1905.

Application filed January 20, 1903. Serial No. 139,806.

*To all whom it may concern:*

Be it known that we, PETER B. JOHNSON and JAMES E. MCCOY, citizens of the United States of America, both residing at Hegewich, in the county of Cook and State of Illinois, have invented a certain new and useful Improvement in Pumping and Mixing Apparatus for Carbureters, of which the following is a specification.

The invention relates to apparatus for making gas for illuminating and heating and other purposes, by saturating air with a volatile hydro-carbon, and particularly to the means for supplying air to the hydro-carbon and mixing fresh air in the saturated air containing the hydro-carbon. The objects of our invention are, first, to provide convenient means for supplying air under proper pressure to be saturated with the hydro-carbon and other means for introducing fresh air to mix therewith for the purpose of diluting the same; secondly, to provide means for accurately measuring and maintaining the proper proportion between the saturated gas and the fresh atmospheric air supplied thereto; thirdly, to provide separate air pumps for forming the vapor and for introducing air to dilute the same, preparatory to the burning of the gas; fourthly, to produce gas in a perfectly uniform manner and to apply thereto the fresh air in a uniform proportion throughout; fifthly, to provide for automatic operation of the apparatus by means of the natural laws of flow of fluids; sixthly, to connect for positive co-operation a source of fresh air and a source of vaporized air, so that the mixture of the two may be a constant quantity; seventhly, to produce an apparatus by which the mixture of vapor and air may be absolutely under control at all times and variable at will; eighthly, the provision of certain novel valve reversing mechanism and other superior construction in the apparatus such as will hereinafter appear, and to simplify and cheapen the entire apparatus.

The above objects, as well as other advantages which will hereinafter appear, we attain by use of apparatus constructed and designed as illustrated in preferred form in the accompanying drawings, wherein—

Figure 2 is a vertical section of the storage tank and the pump-and-regulating tank.

Figure 3 is a vertical section of the gas mixing tank for the vapor.

Figure 4 is a side elevation, and part section, of the cut-off valve and reversing mechanism for operating the supply pump.

Figure 5 is a top plan view of the bracket upon which the valve mechanism of Figure 4 is mounted.

Figure 6 is an enlarged sectional view of the type of valve used throughout the apparatus.

Figure 1:
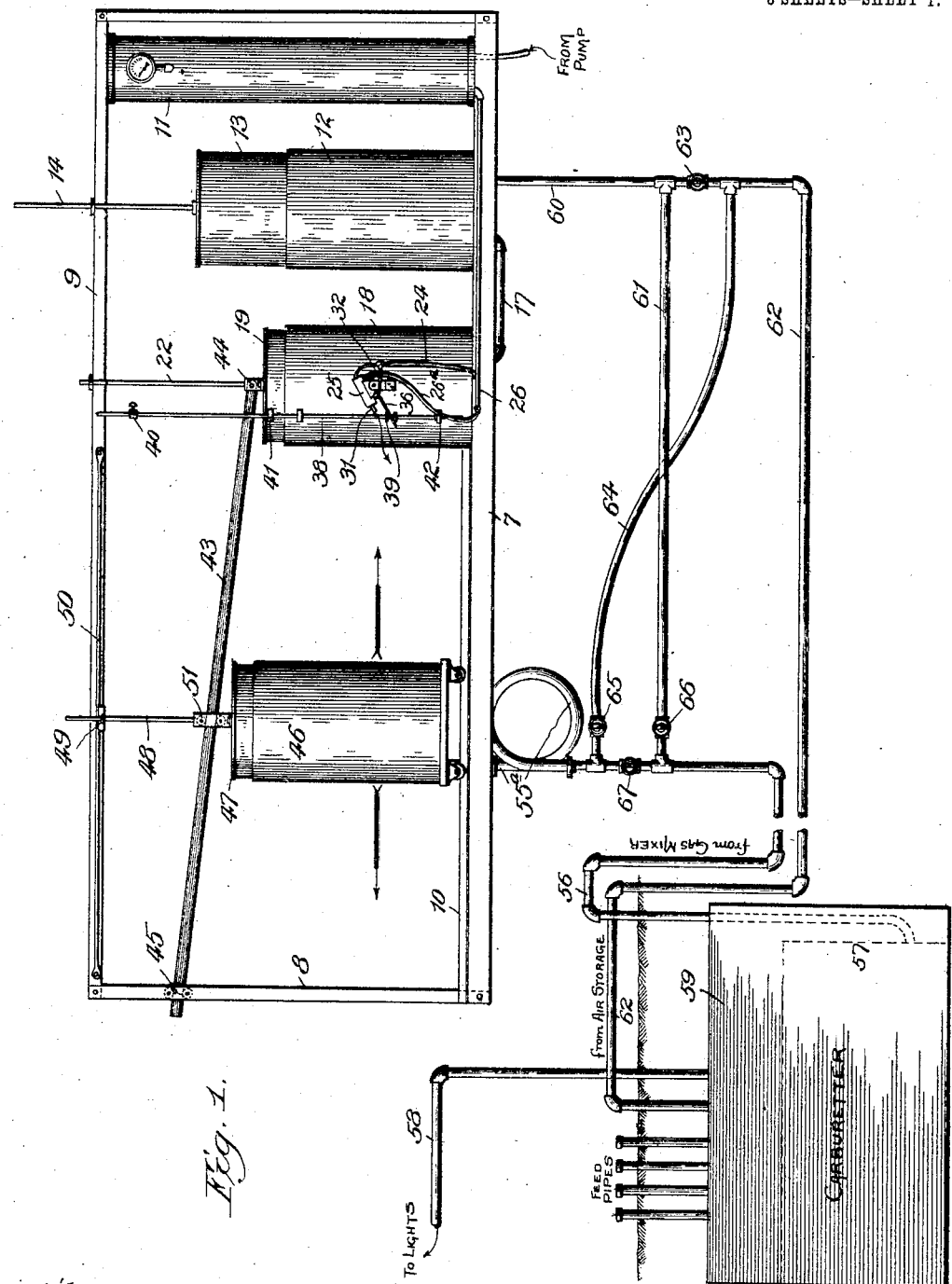
Figure 1 is a diagrammatic external side elevation showing the apparatus as a whole.

In a general way the apparatus is to be used in connection with what are commonly called carbureters, that is to say, devices in which there is a supply of some volatile hydro-carbon through which air is passed in such a way as to saturate the air with the oil or other hydro-carbon, in order to provide for ready and complete oxidation of the product when it is brought to the burners. The apparatus therefore consists in means for supplying to such carbureters the air to make what we may call the vapor, and also a separate supply to mix with the vapor just before the escape of the same to pass out to the burner. These two air supplies are provided for so as to make a constant and regular supply, and further, to be able to readily proportion the amount of each of these air supplies. The actuating agent in performing these functions may either be compressed air or water under pressure, as may be desired, but we have indicated in the present instance a pump driven by compressed air which is shown as proceeding from a supply in the tank at the extreme right of Figure 1.

For convenience of description and for making the invention clear, we have in the drawings, arranged a series of separate tanks operating to perform the several functions which we wish to attain, but the arrangement of these tanks is not at all necessary to the invention, and it will be understood that modifications may readily be made in the same.

Referring now to the drawings, and more particularly to Figure 1 at first, it will be observed that on a base 7 which has a framework 8, 9, we have placed an actuating-fluid supply 11, a storage reservoir 12 and intake tanks 18 and 46. The fluid, (which may be either compressed air or liquid under pressure), passes from the supply in tank 11 through a series of pipes hereafter described, into the bottom of tank 18 and into a cylinder 21—(see Fig. 2)—placed inside of the tank 18. This tank 18 has the usual double wall construction (18$^a$) to provide a water seal, and a reciprocating bell 19. A central rod 22 is fixed in the top of the bell 19, and passes downward through the top of the tank (18$^a$), and within the cylinder 21 is provided with a plunger 23. The air or other actuating fluid under pressure coming from the supply 11 through the pipe 24 and entering beneath the plunger 23, raises the same and with it the bell 19, the rod 22 being guided above as by a socket fixed in the top bar 9 of the frame of the apparatus. The rising of the bell 19 draws in air through the check-valve 71, as is ordinary in such constructions, and will be readily understood.

In order to render automatic the rising and falling of the intake bell 19, we provide the device shown in Figure 4. The actuating fluid from the supply 11 enters through the pipe 26 and a flexible hose 26$^a$, through a port 29 into a cylinder 25 and thence through the port 30 and pipe 24 into the actuating cylinder 21, where its operation in raising the bell 19 is as before described. During the operation of raising the bell, the cut-off or shift valve is in the position shown in Figure 4. The cylinder 25 is pivotally mounted in any convenient way, as by supports 33 resting on a trunnion 34, which may be supported from the tank 18, or in any other desired way. Inside the cylinder 25 are two weighted plungers 27, 28, (which may, however, be made in one), and these control the openings 29 and 30. There is an arm 36 pivoted on the trunnion 34 and having one end loosely working in a slotted bracket 35, which is attached to the base bracket 33 of the cylinder 25. A slotted head 37 of this lever rides upon a bar 38, between two buttons 39. The bar 38 is vertically movable through the eyes 42 fixed to the tank 18. It is provided at its upper end (see Fig. 1) with a removably attached button 40, which when the bell 19 rises to its limit, is struck by the collar 41 on bell 19 and raised up, which it will be evident causes the arm 36 to tilt the cylinder 25, when the pistons therein will drop back to the opposite end of the cylinder, and close the two ports 29 and 30, shutting off the supply of actuating fluid. At the same time it opens the ports 31 and 32$^a$ by which escape from the pipe 24 through the pipe 32 is had either to the outside air or to some other receptacle, in order to relieve the pressure in the cylinder 21 and allow the bell 19 to fall. By this means the pumping of air through the tank 18, 19, is continuous and automatic, and the length of stroke evidently may be varied by adjusting the vertical position of the button 40.

Referring now to Figure 2, it will be seen that on the descent of bell 19 the check valve 71 will close and the air will be forced through the pipe 17 and through the check valve 16 into the bell 13 of the tank 12, which tank is constructed similarly to tank 18, as usual, and with a water seal. The bell 13 may be guided by a rod 14 passing through the overhead frame, and it is evident that its weight will preserve a constant pressure of air inside the said tank. This air passes out through the pipe 60, through the open cock 63 and pipe 62 into the upper collecting chamber (59) of an ordinary carbureter 57, where it is mixed with the vapor or saturated air from the carbureter. This latter may be of any desired construction, and its particular form is entirely immaterial to our invention; though it will be understood that as usual in such devices there is a collecting chamber (59) for the saturated air, where it is stored preparatory to passing out through the pipe 58 to the burners.

To the top of the reciprocating bell of the air pumping tank, (19), or to the rod 22 thereof, we attach one end (44) of a pivoted lever bar 43, whose other end is confined from vertical movement at 45 on the frame 8. On a track 10 of the framework or the base 7, we place the carbureter supply-tank or "mixer" 46, with the usual construction of such tank as shown in Figure 3, having a reciprocating bell 47, and it has a guide rod 48 which is carried in a shifting socket 49 on a horizontal rod 50 attached to the frame 9, so that the said tank 46 may be shifted sidewise. Through a yoke provided with rollers 51 on the rod 48 of the bell 47 we pass the bar 43 beforementioned; and it will be evident that as the end of the bar 44 is vertically reciprocated the rod 48 and bell 47 also will be vertically reciprocated, and that the amount of intake of the said bell 47 will depend upon its relative position between the two ends of the pivoted bar 43. As will be evident from inspection of Figure 3, the rising of bell 47 will take in air through the check valve 54, and the falling thereof will expel the same through the pipe 53, valve 54$^a$, the pipe 55, the flexible hose 55$^a$, and pipe 56 into the carbureter 57. The proportion between the air fed to the carbureter for the purpose of saturating the same with hydro-carbon and the air fed from the tank 12 through the pipes 60 and 62 to mix with this saturated air just previous to its discharge to the burners can be accurately regulated at will by merely shifting sidewise the mixer tank 47, which operation need not interrupt the working of the pump 18.

There are provided stop cocks 63, 65, 66 and 67, as seen in Figure 1, there shown in the present position as closed at 65 and 66 and open at 63 and 67. By reversing the position of these and opening 65 and 66 and closing 63 and 67, it is evident that the air from the tank 46, which is less in quantity, will be introduced into the storage reservoir of the carbureter while the greater quantity of air from tank 12 will pass through the carbureter, so that any desired relation between the amounts of the two supplies can readily be provided for.

We have shown in detail at Figure 6 a convenient form of valve, which consists in the cage 70 which surrounds the opening of a pipe and a disk 71 resting upon said opening and on a leather packing 72 held in place on the mouth of the tube by the rings 73.

From the above description it will be evident that in operation the actuating fluid from the supply vessel 11 will continuously keep the plunger 23 and the air pump bell 19 in motion, automatically, and from this bell 19 the flow through the tank 12 will be regular into the reservoir of the carbureter; and at the same time the supply of air from the pump bell 47 will be kept up in the vaporizing chamber of the carbureter, entering through the pipes 55ª and 56. The mixed air and vapor will thereupon pass out through the pipe 58 as it is needed to supply the burners and will insure complete combustion of the vapor. The quality of the mixture supplied to the burners is really made thinner or richer in hydro-carbons at will by the simple act of shifting the tank 46 sidewise on its track. And the volume of air supplied to the carbureter for both purposes is easily regulated by shifting the position of the button 40. It is evident also that we might provide a throttle valve at some point in the discharge pipe from the actuating cylinder 21, so as to change the cross-section of the escape port and thus regulate the rapidity of action of the bell pump. Various modifications, both in the form of the parts and the arrangement of the different elements of the apparatus will be obvious to a skilled mechanic familiar with the art. It is obvious, for instance, that the essential part of the apparatus which attains the function of regulating the proportion between the air supplied to the carbureter itself and the air mixed with the vapor would be the same if we dispensed with the particular driving means for the air pump 18, 19, and substituted any other well-known type of actuator.

But having thus described our invention and illustrated a preferred form of its embodiment, what we claim, and desire to secure by Letters Patent, is the following:

1. In a mixing apparatus the combination of two air pumps mounted at different points upon an oscillating pivoted arm, one of which pumps is shiftable on said arm in order to vary the proportional length of stroke of the two pumps, for the purposes set forth.

2. In air mixing apparatus for carbureters the combination with a supply of actuating fluid, of an air pump driven by means of said fluid in one direction and by gravity in the other, a lever arm attached to the movable part of said pump, and a second pump communicating with a common receptacle with the first pump and having its moving part attached to said lever and adjustable in position thereon.

3. In an air mixer for carbureters the combination with an air pump and supply tank for the carbureter of a second pump actuated by the motions of the first pump and having communication with a common receptacle therewith, and means for graduating the proportion between the strokes of the two pumps, substantially as described.

4. The combination with a carbureter of an air supply tank therefor, an air pump for feeding said tank, comprising a reciprocating bell, and an air pump for supplying fresh air to the saturated vapor of the carbureter, said pump being driven by a reciprocating lever arm attached to the bell of the first mentioned pump and being shiftable on said lever arm in order to vary the length of stroke of the said air supply pump, the tank and both pumps communicating with a common receptacle so as to be under constant pressure.

5. In air mixing apparatus in combination with a carbureter, a primary air pump for feeding the same, an auxiliary air pump for diluting the carbureted air, an operating lever to move the movable portion of the auxiliary pump, the same being attached to the primary pump and the auxiliary pump being shiftable in position on said lever to alter the relative length of stroke of the auxiliary pump, substantially as described.

6. In combination with an actuating pump, and a lever attached to its movable part, of an auxiliary reciprocating bell pump movably mounted and actuated by said lever, so that its stroke may be regulated by moving the point of attachment to said lever.

In testimony whereof we have hereunto signed our names in the presence of the subscribed witnesses.

PETER B. JOHNSON.
JAMES E. McCOY.

Witnesses as to the signature of Peter B. Johnson:
PAUL CARPENTER,
EDWARD C. BURNS.

Witnesses as to the signature of James E. McCoy:
JAMES BURNS,
WILSON B. GOLDEN.